E. DANIELS.
DISCHARGER FOR SUGAR CENTRIFUGALS.
APPLICATION FILED AUG. 23, 1920.

1,388,173.

Patented Aug. 23, 1921.
4 SHEETS—SHEET 1.

E. DANIELS.
DISCHARGER FOR SUGAR CENTRIFUGALS.
APPLICATION FILED AUG. 23, 1920.

1,388,173.

Patented Aug. 23, 1921.
4 SHEETS—SHEET 2.

E. DANIELS.
DISCHARGER FOR SUGAR CENTRIFUGALS.
APPLICATION FILED AUG. 23, 1920.

1,388,173.

Patented Aug. 23, 1921.

Inventor:
Edmund Daniels

E. DANIELS.
DISCHARGER FOR SUGAR CENTRIFUGALS.
APPLICATION FILED AUG. 23, 1920.

1,388,173.

Patented Aug. 23, 1921.
4 SHEETS—SHEET 4.

Inventor:
Edmund Daniels
By Chas. J. O'Neill
Atty

UNITED STATES PATENT OFFICE.

EDMUND DANIELS, OF LAHAINA, MAUI, TERRITORY OF HAWAII.

DISCHARGER FOR SUGAR-CENTRIFUGALS.

1,388,173. Specification of Letters Patent. Patented Aug. 23, 1921.

Application filed August 23, 1920. Serial No. 405,542.

*To all whom it may concern:*

Be it known that I, EDMUND DANIELS, a citizen of the United States, residing at and whose post-office address is Lahaina, Maui, Territory of Hawaii, have invented certain new and useful Improvements in Dischargers for Sugar-Centrifugals; and I do hereby declare the following to be a full, clear, and exact description of the invention, such as will enable others skilled in the art to which it appertains to make and use the same.

The invention relates to improvements in apparatus for removing the accumulation of sugar or cake from the filtering or straining walls of centrifugal machines and has for its object to improve and simplify the mounting, adjustment and operation of the device to the end that all of the deposit or cake may be removed from the basket wall by means of a suitable plow, involving a cutting blade which excises the bulk of the cake, associated with a scraping blade adapted to be projected a slight distance beyond the operative edge of the cutting blade and which serves to scrape the final layer of sugar from the basket wall, the cutting blade being withheld from actual contact with the basket wall to avoid danger of damaging the latter or the mechanism of the discharger. The invention further includes novel means for adjusting the plow vertically and horizontally within the basket of the centrifugal, so that the plow may be fed uniformly to remove successive portions of the cake as the latter rotates with the basket in contact with the plow. A further novel feature of the invention comprises means for interposing a resistance element between the fixed portion of the discharger and the shaft of the centrifugal machine to counteract the thrust or radial force produced when the plow is driven into the hard packed sugar cake, which would normally tend to swing the basket outward and away from the plow.

These and other novel features of the invention will appear in the following description, predicated upon the accompanying drawings, in which:—

Fig. 7 is a sectional elevation of the upper end of the plow spindle;

Fig. 8 is a sectional plan view showing the mounting for the plow spindle and a means for rotating the spindle into operative and inoperative positions;

Fig. 9 is a fragmentary sectional elevation of the spindle mounting and reciprocating means;

Fig. 10 is a longitudinal section of the plow.

Figure 1:
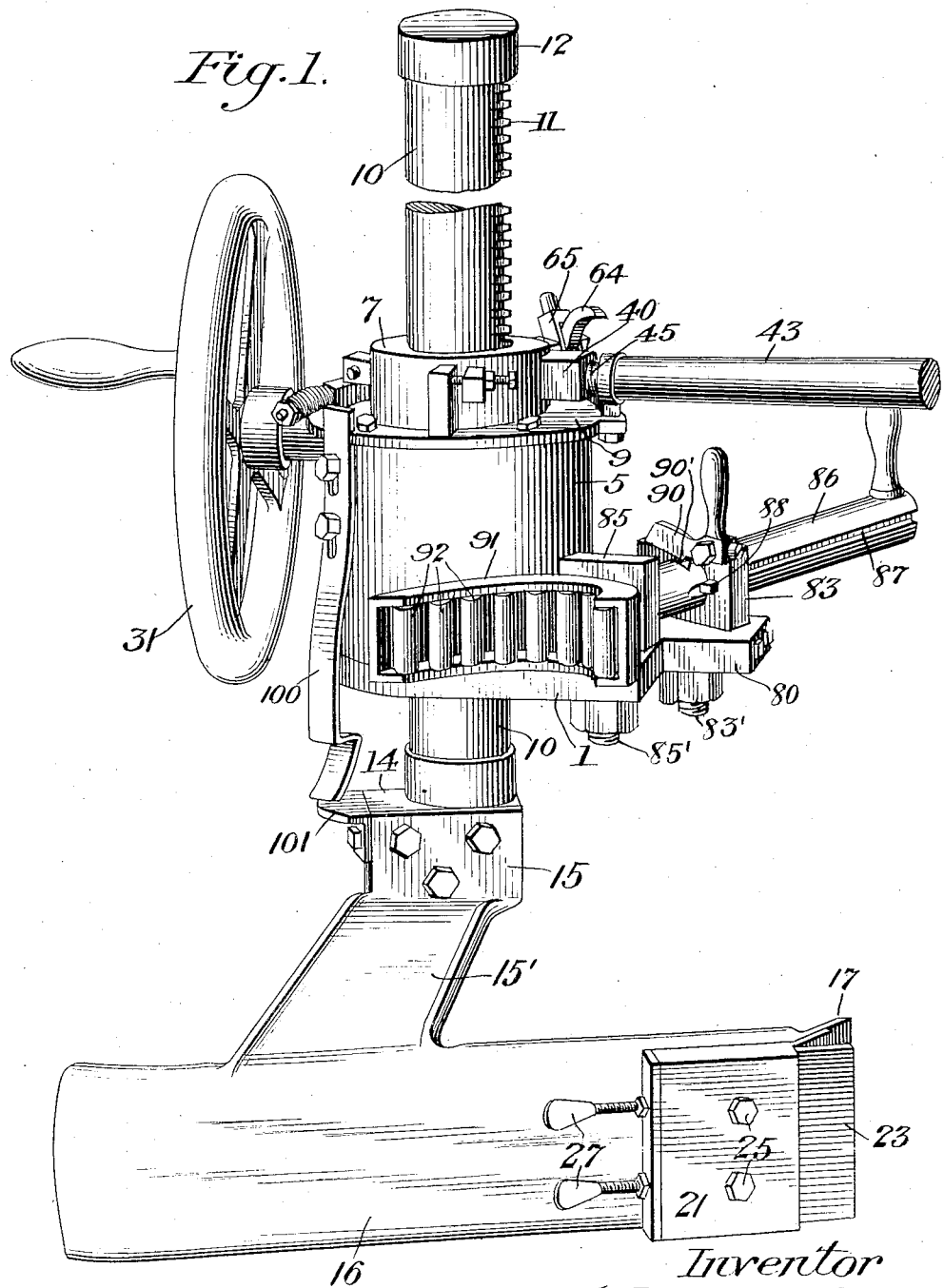
Figure 1 is a perspective view of the discharger adapted to be applied to a standard form of sugar centrifugal machine involving a rotating screen or basket supported and driven from a central shaft.

Referring to the drawings, 1 indicates a plate adapted to be secured to the annular top plate, table or curb of the centrifugal machine by means of suitable bolts 3 passing through elongated slots 2 in said plate 1. In order to accurately position the apparatus on the centrifugal, leveling screws 4 are mounted in the plate 1 and bear upon the top surface of the table or curb of the centrifugal machine, as more particularly illustrated in Figs. 4 and 6. The inner end of plate 1 extends beyond the inner edge of the table or curb and has secured to its upper face a hub 5 which is provided with a central vertical bearing 6 for the plow spindle 10. The upper end of the hub 5 is provided with an annular recess 8 which receives the flange of a collar 7, which latter is secured in position by means of a lock plate 9 which is bolted to the top of the hub 5.

Mounted in the hub 5 and the collar 7 is a circular spindle 10 on the surface of which is formed a rack 11, the individual teeth of which are radial to the axis of the spindle and extend approximately half way around the circumference of the spindle, so that the rack teeth may be properly engaged with the coöperating driving gear for all positions of adjustment of the spindle. Secured to the upper end of spindle 10 is a cap 12 which may be adjusted by means of its screw-threaded engagement with the spindle and serves as a stop to determine the lower limit of movement of the spindle, and therefore of the plow which is carried by the latter, said cap being adapted to engage the upper end of the collar 7 when the plow reaches the lower limit of movement in the basket of the centrifugal machine.

Mounted on the reduced lower end of the spindle 10 and secured rigidly thereto by means of suitable dowel pins, or other locking device not shown, is a hub 14, fixed to the shaft by means of a nut 13. Bolted to one face of the hub 14 is a bracket member 15 having a lateral arm 15' from which extends a horizontal plow member 16 terminating in its forward end in a knife or cutting blade 17, which may be formed either integrally with the plow 16 or as a separate element attached thereto. It is preferred that the upper and lower edges of the plow 16 be curved or flanged inwardly to provide a guide for the sugar layers cut from the cake and direct the same inwardly toward the discharge opening in the basket of the centrifugal machine.

Secured to the outer face of the plow 16 is a housing consisting of a base plate 20, the forward end of which is bent over to reinforce the cutting blade 17, and a channel shaped cover plate 21, the elements of the housing being secured by means of bolts 25. Slidably mounted within the housing is a flat scraper plate 23 preferably made of wood, indurated fiber, or other suitable material, provided with longitudinal slots 24 through which the bolts 25 pass to permit the scraper plate 23 to move longitudinally of the plow, so that when the knife or cutting blade 17 has reached the outer limit of its movement the scraper plate may be projected beyond the edge of the knife to remove the final layer of sugar cake which the knife does not reach. In order to force the scraper plate 23 forward into engagement with the surface of the sugar cake, compression springs 26 are mounted in the housing behind the scraper plate and are, in turn, operated upon by follower screws 27 which regulate the pressure exerted by the springs.

Figure 2:
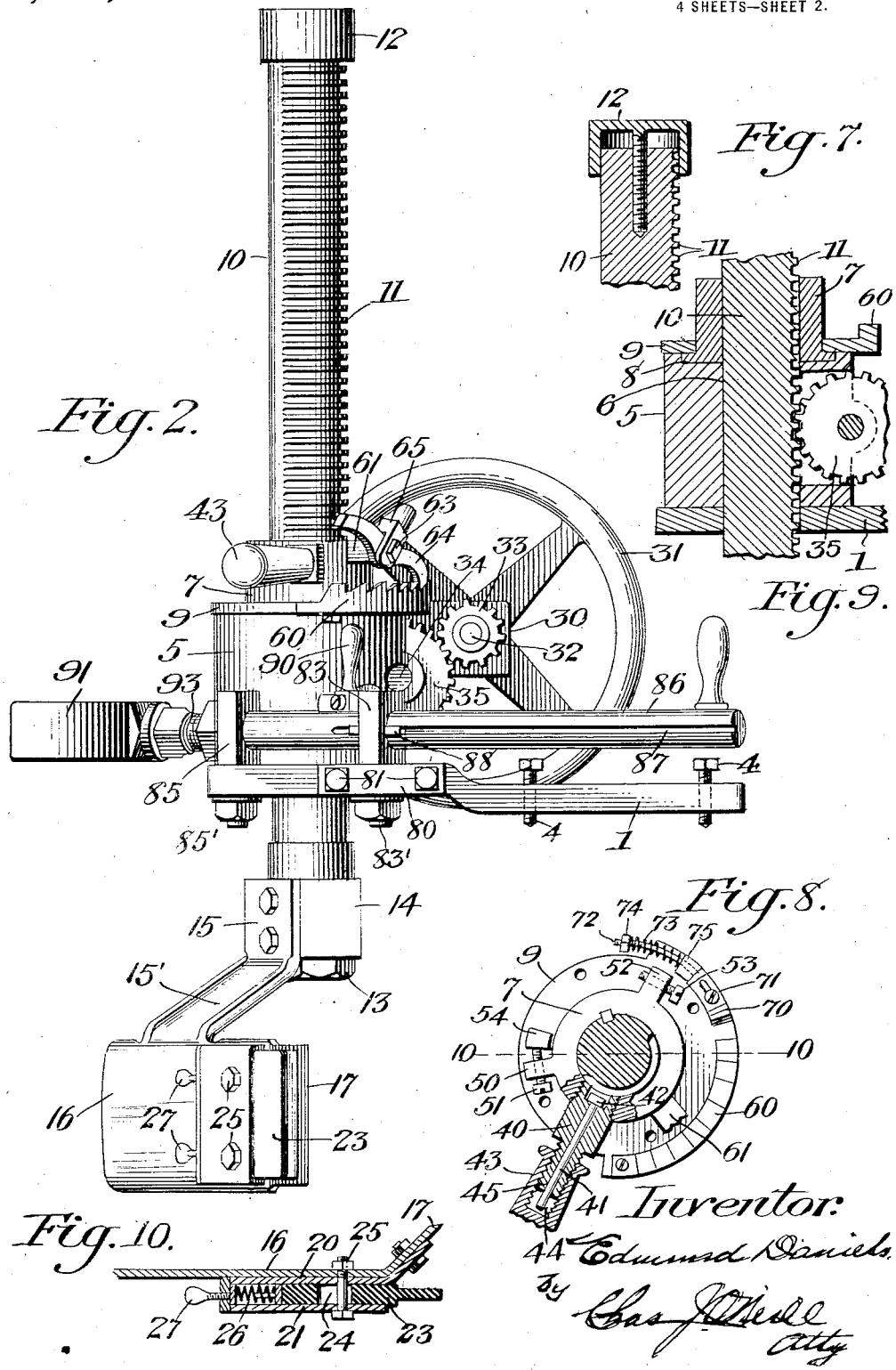
Fig. 2 is a vertical elevation of the apparatus.
Figure 3:
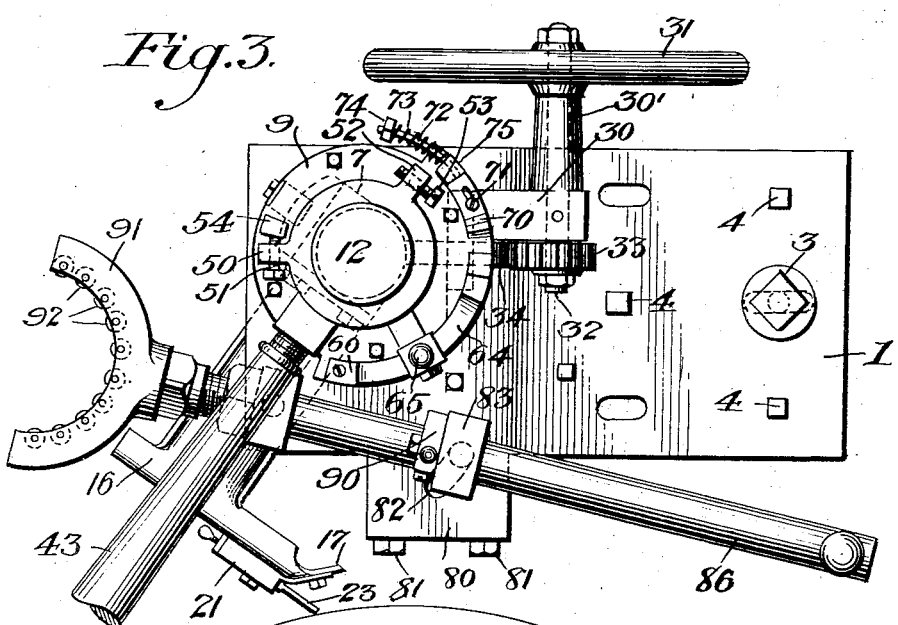
Fig. 3 is a plan view.
Figure 4:
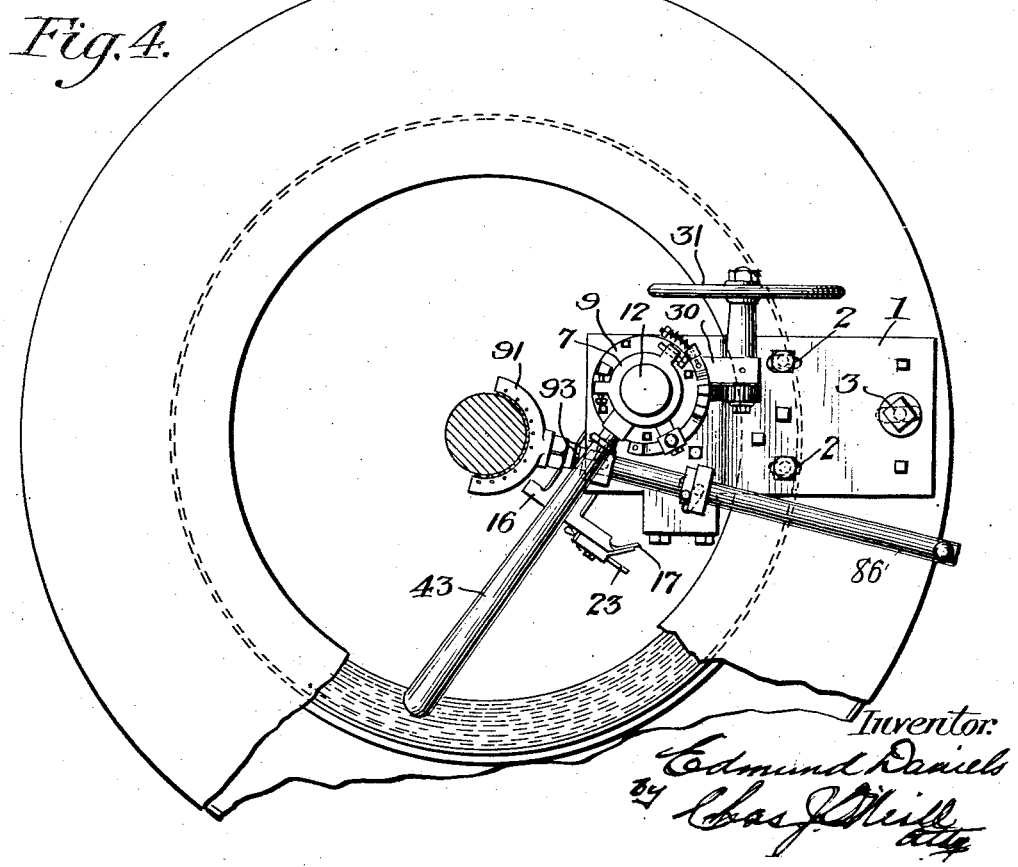
Fig. 4 is a similar view showing the apparatus mounted on the centrifugal machine with the plow in retracted relation.
Figure 6:
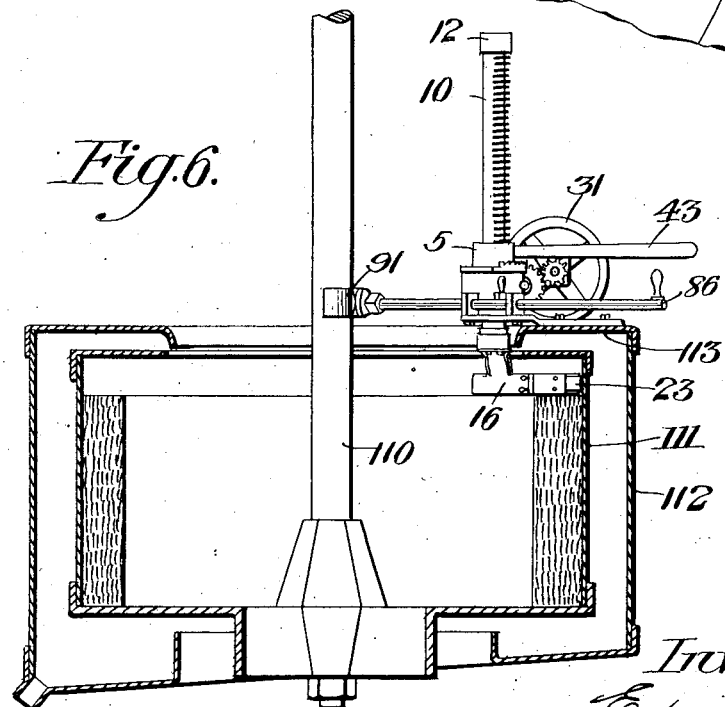
Fig. 6 is a diagrammatic sectional elevation of the apparatus applied to a centrifugal machine.

Projecting from the hub 5 is a lug or bracket 30 provided with an elongated bearing sleeve 30' in which is journaled the shaft 32 of a hand wheel 31, upon the opposite end of which shaft is mounted gear 33 which meshes with a second gear 35 carried by stub shaft 34 journaled in bearings formed on the face of the said hub 5, which latter is slotted vertically to permit the gear 35 to extend through the hub and engage the rack teeth 11 on the spindle 10, as more particularly illustrated in Figs. 2 and 9, so that when the hand wheel 30 is operated in one direction or the other the spindle 10 will be raised or lowered with respect to the supporting bracket comprising the base plate 1 and the hub 5. In order to rotate the spindle 10 into operative or inoperative position, and to regulate the feed of the plow to the sugar cake, the collar 7, which is rotatably mounted on the top of hub 5, is provided with a radially extended handle 43. The spindle 10 is locked against independent rotary movement in the collar 7 by means of a suitable spline as indicated in Fig. 8, but is free to be moved longitudinally in either direction in the collar 7 and the hub 5 by means of hand operated gearing, as described. In devices of this general character it is customary to cut out successive sections of the sugar cake, the cutting operation progressing from the top to the bottom of the basket and as each layer or section of the cake is cut away, by advancing the plow toward the inner wall of the basket, it is desirable that some means be provided to prevent the spindle being moved in a vertical direction while a given section of the cake is being removed. To effect this object means are provided for locking the spindle 10 to the collar 7. A relatively simple and effective device to effect this purpose is illustrated in Fig. 8 and comprises a nipple 40 threaded into the side of the collar 7 provided with a central bore carrying a plunger 41 having a head 42. The outer end 45 of the nipple is exteriorly screw threaded to receive the threaded socket 44 on the inner end of the handle 43, so that when the handle is turned to move the threaded end thereof up on the threaded end of the nipple, the plunger 41 is advanced and the end 42 thereof is forced into engagement with the spindle 10 and locks the latter against axial movement in the collar 7. When the handle is backed part way off the nipple 40 the plunger is released and the spindle is free to be adjusted longitudinally. During the normal operation of the centrifugal machine in separating the sugar from the fluid mixed therewith the plow is, of course, swung to an inoperative position, as shown in Figs. 3, 4 and 6, by moving the handle 43 in a clockwise direction which rotates the collar 7 and the spindle 10. During the cutting operation the plow is moved by successive steps toward the periphery of the basket of the centrifugal machine, and in order to prevent the plow coming into contact with any of the moving parts of the centrifugal machine in either position, suitable stops are provided, said stops including a lug 54 mounted on the top of plate 9 and two lugs 50 and 52 extending radially from the collar 7, said lugs 50 and 52 being provided with adjustable screws 51 and 53 respectively, which engage the stationary lug 54 as the collar and spindle is rotated to the right or the left. By properly adjusting the set screws 51 and 53 the limit of movement of the shaft 10 and its attached plow in either direction may be accurately determined.

The sugar cake accumulates in the basket of the centrifugal machine until a relatively thick layer of the same is formed on the vertical walls of the basket extending from the top to the bottom thereof and, as the plow cuts out successive ring-like sections of the cake, it is necessary to feed the plow into the cake at a relatively uniform rate to prevent damage to the basket or to the mechanism of the discharger. For example if it were attempted to cut out too deep a section of the sugar cake at a single operation the thrust of the knife into the hard sugar would tend to derange the elements of the discharger and distort the basket. In order to insure a regular and uniform feed of the knife or cutter to the sugar cake there is secured to the outer rim of the lock plate 9, a ratchet plate 60 with the teeth of which coöperates a double acting pawl 64 which is mounted upon a journal pin 63 secured to a lug 61 projecting from the collar 7, said pawl being held in either of its operative positions by means of a spring device 65. As the handle 43 is moved in an anti-clockwise direction to advance the plow toward and into the sugar cake carried by the rapidly revolving basket of the centrifugal machine, the pawl 64 rides over the teeth of the ratchet and not only affords an accurate index for the feeding of the cutting edge of the plow into the sugar but prevents the reaction of the plow against the sugar forcing the plow backward or away from its cutting position. Under these circumstances the left-hand member of the pawl shown in Fig. 2 would be in engagement with the ratchet teeth with the end of the pawl in engagement with the vertical wall of the corresponding ratchet tooth to effectively lock the collar 7 and spindle 10 against a reverse movement. In order to allow a certain amount of elasticity between the plow and the sugar cake as the plow nears the outer limit of its movement the end ratchet tooth 70 is formed separately and is mounted for sliding movement on the plate 9 by means of a pin and slot 71, said tooth being normally retracted by a spring 73 carried on a rod 72 connected to the pawl and sliding in a lug 75 on the plate 9, the tension of the spring 73 being regulated by a nut 74 on the outer end of the rod 72. When the left-hand end of the pawl 64 is in engagement with tooth 70 and the cutting end of the plow encounters a heavy resistance the slidable tooth 70 is moved forward by the pawl against the tension of the spring 73 to a sufficient extent to permit the collar 7 and the spindle 10 to move a slight distance in a clockwise direction and thereby relieve the excessive pressure on the plow as the latter is thereby permitted to move away from the sugar cake.

When the knife edge 17 of the plow encounters the relatively hard resistant layer of sugar cake in the rapidly revolving basket of the centrifugal, the plow being relatively rigid produces a heavy thrust, which has a tendency to force the basket away from the point of contact, thereby interfering with the cutting operation and tending to throw the shaft of the centrifugal out of line. In order to counteract this thrust and obviate the objectionable results thereof the discharger is provided with a special form of strut device, which is interposed between the base plate 1 of the discharger and the operating shaft of the centrifugal, which has the effect of holding the shaft in alinement and the cutting edge of the plow up to its work. The particular form of strut or brace exemplified in the present invention includes a slidable rod 86 mounted in bearing blocks 83 and 85 which are secured to base plate 1. The forward bearing block 83 is secured to an extension 80 of the base plate 1 in an elongated slot 82 which is engaged by a screw threaded shank 83' on said block to permit a certain amount of lateral adjustment of the block. The rear bearing block 85 is pivotally mounted in an opening in plate 1 by means of a screw threaded shank 85'. The bearing block 83 carries a key 88 which engages a longitudinal slot in the rod 86 to prevent rotation of the latter. The block 83 also carries a pivoted latch 90 adapted to engage a notch 90' in the rod 86 to hold the latter in its adjusted position. On the inner end of the rod 86 there is mounted a semi-circular yoke 91, which is connected with the rod by a suitable screw coupling 93. Journaled in the concave face of the yoke 91 is a series of anti-friction rolls 92 which engage the supporting shaft of the basket of the centrifugal machine, as more particularly illustrated in Figs. 4 and 6, so that, when the rod 86 has been properly adjusted in the bearing blocks and moved inwardly until the yoke 91 engages the shaft of the centrifugal and said rod is locked against longitudinal movement by the latch 90, the said rod constitutes a rigid strut or brace which prevents the basket of the centrifugal machine being swung laterally away from the cutting end of the plow when the latter engages the sugar cake.

Figure 5:
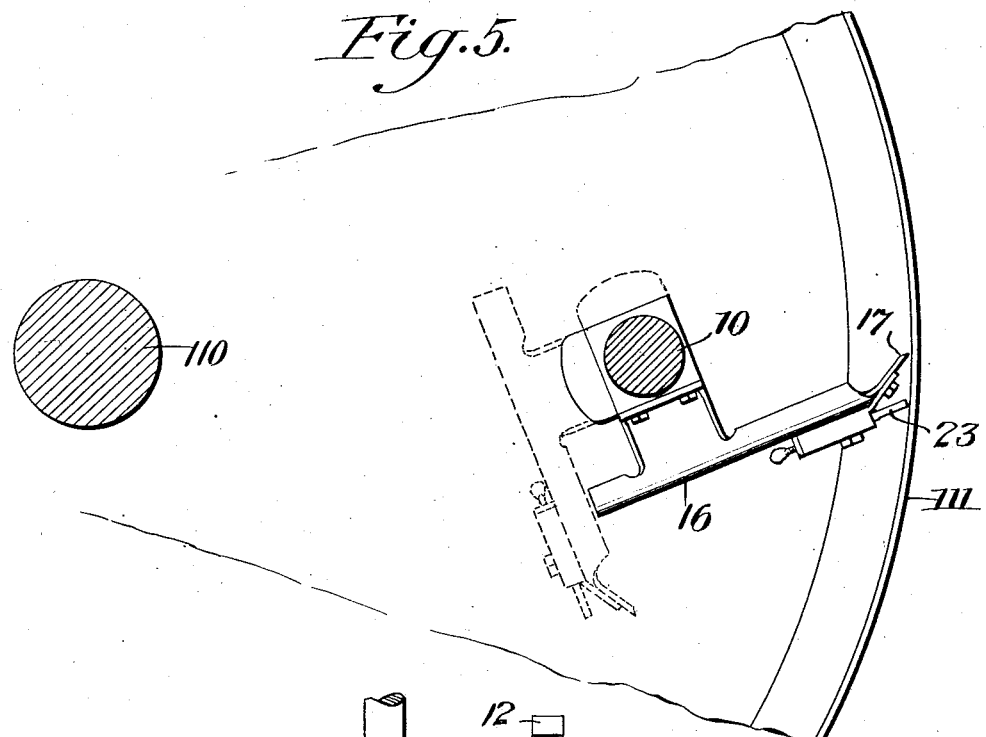
Fig. 5 is an enlarged sectional plan view of the plow in operative relation to the basket.

When the centrifugal machine is being operated to separate the sugar from the liquid or liquids associated therewith the discharger is moved to inoperative position by swinging the handle 43 in a clockwise direction, so that the plow is disposed toward the center of the basket, as shown more particularly in Fig. 5. After a sufficient quantity of sugar has been deposited upon the inner wall of the basket and it is desired to discharge the cake, the pawl 64 is swung to bring its left-hand member into engagement with the rack 60. The plow spindle 10 is locked to the collar 7 by rotating the handle 43 on its axis to force the plunger 41 into engagement with the spindle 10. The collar 7 and spindle 10 are then moved in an anticlockwise direction until the cutting edge 17 of the plow engages the sugar cake and begins to cut the same in a circular path, due to the rotation of the basket. The plow is advanced by successive steps in its cutting operation by continued rotation of the spindle 10 by means of the handle 43, the successive cuts being indicated by the left-hand end of the pawl 64 engaging the successive ratchet teeth. When the pawl engages the final yielding tooth 70 of the ratchet the plow has reached the end of its cutting operation, at which time scraper blade 23 is forced by the springs 26 against the remaining layer of sugar adjacent the inner wall of the basket and is effective in scraping off said layer of sugar without damaging the basket. The cutting edge of the knife is prevented from coming into contact with the wall of the basket at any time by the set screw 53, carried by lug 52 on the collar 7, coming in contact with the fixed lug 54 on the plate 9. After the plow has been advanced to its outer limit in the cutting operation, it is gradually fed downward, by turning the hand wheel 31 until it reaches the lower limit of its travel, when all of the accumulated sugar will have been cut away from the basket wall. When this has been effected the plow is swung to its inoperative position and the spindle elevated to its upper limit by reversing the movement of the hand wheel 31, which causes the gear 35 to move the spindle 10 upwardly. When said spindle reaches its upper limit a spring latch 100 secured to the side of hub 5 snaps under a flange 101 on the hub of the plow and serves to support the spindle and plow, thereby relieving the operating mechanism of unnecessary strains due to the weight of the spindle and plow.

What I claim is:

1. A discharger for sugar centrifugals, comprising a fixed bracket, a collar rotatably secured therein, a spindle mounted for vertical movement in and rotary movement with said collar, a semi-circular rack on said spindle, driving gear journaled on said bracket and meshing with said rack, and a plow fixed to the lower end of the spindle.

2. A discharger for sugar centrifugals, comprising a fixed bracket, a collar rotatably secured therein, a spindle mounted for vertical movement in and rotary movement with said collar, a semi-circular rack on said spindle, driving gear journaled on said bracket and meshing with said rack, a plow fixed to the lower end of the spindle, and a handle for rotating said collar and locking the spindle thereto.

3. A discharger for sugar centrifugals, comprising a fixed bracket, a collar rotatably secured therein, a spindle mounted for vertical movement in and rotary movement with said collar, a semi-circular rack on said spindle, driving gear journaled on said bracket and meshing with said rack, a plow fixed to the lower end of the spindle, a handle for rotating said collar and locking the spindle thereto, a ratchet on the bracket, and a pawl carried by the collar coöperating therewith.

4. A discharger for sugar centrifugals, comprising a fixed bracket, a collar rotatably secured therein, a stop lug on said bracket, adjustable stops on the collar coöperating with said lug to limit the rotary movement of said collar in both directions, a spindle mounted for vertical movement in and rotary movement with said collar, a semi-circular rack on the spindle, driving gear journaled on said bracket meshing with said rack, and a plow fixed to the lower end of the spindle.

5. A discharger for sugar centrifugals, comprising a fixed bracket having a hub thereon, a collar rotatably secured on said hub, a spindle mounted for vertical movement in and rotary movement with said collar, a semi-circular rack on the spindle, driving gearing journaled on said bracket coöperating with said rack to raise and lower the spidlle, a plow fixed to the lower end of the spindle, and means to rotate the collar and spindle step by step during the cutting operation of the plow.

6. A discharger for sugar centrifugals, comprising a fixed bracket having a hub thereon, a collar rotatably secured on said hub, a spindle mounted for vertical movement in and rotary movement with said collar, means to lock the spindle to the collar, a semi-circular rack on the spindle, driving gearing journaled on said bracket coöperating with said rack to raise and lower the spindle, a plow fixed to the lower end of the spindle, and means to rotate the collar and spindle step by step during the cutting operation of the plow.

7. A discharger for sugar centrifugals, comprising a bracket having a hub, a spindle mounted for vertical and rotary adjustment in said hub, said spindle having a longitudinal series of semi-circular teeth thereon, a gear journaled on said bracket and engaging said rack throughout the range of adjustment of the spindle, means for driving said gear, and a plow on the lower end of the spindle.

8. A discharger for sugar centrifugals, comprising a bracket to be fixed to the table of the centrifugal machine, a spindle mounted for vertical and rotary adjustment on said bracket, a plow on the lower end of the spindle, and adjustable means interposed between the bracket and the shaft of the centrifugal to counteract the thrust of the plow in its cutting operation.

9. A discharger for sugar centrifugals, comprising a bracket to be fixed to the table of the centrifugal machine, a spindle mounted for vertical and rotary adjustment on said bracket, a plow on the lower end of the spindle, and an adjustable strut carried by the bracket having an end bearing to engage the driving shaft of the centrifugal machine to counteract the thrust of the plow in its cutting operation.

10. A discharger for sugar centrifugals, comprising a bracket to be fixed to the table of the centrifugal machine, a spindle mounted for vertical and rotary adjustment on said bracket, a plow on the lower end of the spindle, and an adjustable strut having a yoke on the end thereof to engage the shaft of the centrifugal machine to counteract the thrust of the plow in its cutting operation.

11. A discharger for sugar centrifugals, comprising a bracket to be fixed to the table of the centrifugal machine, a spindle mounted for vertical and rotary adjustment on said bracket, a plow on the lower end of the spindle, and an adjustable strut having a yoke on the end thereof provided with roller bearings in its face to engage the shaft of the centrifugal machine to counteract the thrust of the plow in its cutting operation.

12. A discharger for sugar centrifugals, comprising a bracket, a vertically and rotatably adjustable spindle carried by said bracket, and a plow on the lower end of the spindle, said plow including a cutting blade and a scraper adapted to be projected beyond the edge of the cutting blade to remove the final layer of sugar.

13. A discharger for sugar centrifugals, comprising a bracket, a vertically and rotatably adjustable spindle carried by said bracket, and a plow on the lower end of the spindle, said plow including a cutting blade and a spring pressed scraper adapted to be projected beyond the edge of the cutting blade to remove the final layer of sugar.

14. A plow for sugar dischargers, comprising a body portion including a cutting blade, a casing mounted on the front of the body portion adjacent said blade, a scraper slidably mounted in said casing, and means for projecting the forward edge of the scraper beyond the edge of the cutting blade.

15. A plow for sugar dischargers, comprising a body portion including a cutting blade, a casing mounted on the front of the body portion adjacent said blade, a scraper slidably mounted in said casing, and adjustable spring-pressure means for projecting the forward edge of the scraper beyond the edge of the cutting blade.

16. A plow for sugar dischargers, comprising a body portion, a cutting blade on the forward end thereof, a scraper mounted on said body portion behind the cutting blade, and means for advancing the forward edge of the scraper beyond the edge of the cutting blade.

In testimony whereof I affix my signature.

EDMUND DANIELS.